US012569012B2

(12) United States Patent
Lai et al.

(10) Patent No.: US 12,569,012 B2
(45) Date of Patent: Mar. 10, 2026

(54) AEROSOL PROVISION SYSTEMS

(71) Applicant: Nicoventures Trading Limited, London (GB)

(72) Inventors: Sam Lai, London (GB); Ping Chou Chen, London (GB); Tom Woodman, London (GB)

(73) Assignee: Nicoventures Trading Limited, London (GB)

(*) Notice: Subject to any disclaimer, the term of this patent is extended or adjusted under 35 U.S.C. 154(b) by 322 days.

(21) Appl. No.: 18/000,179

(22) PCT Filed: May 21, 2021

(86) PCT No.: PCT/GB2021/051238
§ 371 (c)(1),
(2) Date: Nov. 29, 2022

(87) PCT Pub. No.: WO2021/240136
PCT Pub. Date: Dec. 2, 2021

(65) Prior Publication Data
US 2023/0200452 A1     Jun. 29, 2023

(30) Foreign Application Priority Data

May 29, 2020     (GB) ..................................... 2008107

(51) Int. Cl.
*A24F 47/00*     (2020.01)
*A24F 40/40*     (2020.01)
*A24F 40/51*     (2020.01)
*G01F 1/34*     (2006.01)
(Continued)

(52) U.S. Cl.
CPC .............. *A24F 40/51* (2020.01); *A24F 40/40* (2020.01); *G01F 1/34* (2013.01)

(58) Field of Classification Search
None
See application file for complete search history.

(56) References Cited

U.S. PATENT DOCUMENTS

| | | | |
|---|---|---|---|
| 2009/0095311 A1 | 4/2009 | Han | |
| 2011/0265806 A1 | 11/2011 | Alarcon et al. | |
| 2012/0186594 A1 | 7/2012 | Liu | |

(Continued)

FOREIGN PATENT DOCUMENTS

| | | |
|---|---|---|
| CN | 103908019 | 7/2014 |
| CN | 110200324 | 9/2019 |

(Continued)

OTHER PUBLICATIONS

International Preliminary Report on Patentability received for PCT Patent Application No. PCT/GB2021/051238, mailed on Dec. 8, 2022, 7 pages.

(Continued)

*Primary Examiner* — Dennis R Cordray
(74) *Attorney, Agent, or Firm* — MERCHANT & GOULD P.C.

(57) ABSTRACT

An aerosol delivery system comprising an airflow sensor in a sensor chamber defined by one or more chamber walls and a deformable membrane attached to at least one of the one or more chamber walls, wherein the membrane is attached to the one or more chamber walls over more than half of its surface area.

18 Claims, 5 Drawing Sheets

(51) Int. Cl.

| | | |
|---|---|---|
| *G01L 9/00* | (2006.01) | |
| *H05B 1/02* | (2006.01) | |

(56) References Cited

U.S. PATENT DOCUMENTS

| | | |
|---|---|---|
| 2015/0034103 A1 | 2/2015 | Hon |
| 2015/0068523 A1 | 3/2015 | Powers et al. |
| 2015/0305410 A1 | 10/2015 | Liu |
| 2017/0156399 A1 | 6/2017 | Freeman et al. |
| 2017/0359856 A1 | 12/2017 | Qiu |
| 2018/0007960 A1 | 1/2018 | Suzuki et al. |
| 2018/0333547 A1 | 11/2018 | Freeman et al. |
| 2019/0274359 A1* | 9/2019 | Jain ...................... H05B 1/0297 |
| 2020/0008479 A1* | 1/2020 | Ouyang ................ G01L 9/0041 |
| 2020/0154789 A1 | 5/2020 | Novak et al. |

FOREIGN PATENT DOCUMENTS

| | | |
|---|---|---|
| CN | 110742327 A | 2/2020 |
| DE | 102015115527 B3 | 1/2017 |
| EP | 3590364 A1 | 1/2020 |
| WO | WO2018/055334 A1 | 3/2018 |
| WO | 2020006305 | 1/2020 |

OTHER PUBLICATIONS

European Search Report, European Application No. GB2008107.1, mailing date Dec. 3, 2021, 3 pages.

International Search Report and Written Opinion, International Application No. PCT/GB2021/051238, mailing date Sep. 14, 2021, 12 pages.

Canadian Intellectual Property Office, Canadian Office Action, Application No. 3173489, dated Mar. 13, 2025, 5 pgs.

* cited by examiner

AEROSOL PROVISION SYSTEMS

CROSS-REFERENCE TO RELATED APPLICATIONS

The present application is a National Phase entry of PCT Application No. PCT/GB2021/051238, filed May 21, 2021, which claims priority from Great Britain Application No. 2008107.1, filed May 29, 2020, each of which is hereby fully incorporated herein by reference.

TECHNICAL FIELD

The present disclosure relates to aerosol delivery systems.

BACKGROUND

Aerosol delivery systems such as electronic cigarettes (e-cigarettes) generally contain a aerosol generating material, such as a reservoir of a source liquid, which may contain an active substance and/or a flavor, from which an aerosol or vapor is generated for inhalation by a user, for example through heat vaporization. Thus, an aerosol provision system will typically comprise a aerosol generation chamber containing an aerosol generator, e.g. a heating element, arranged to vaporize or aerosolize a portion of precursor material to generate a vapor or aerosol in the aerosol generation chamber. As a user inhales on the device and electrical power is supplied to the vaporizer, air is drawn into the device through an inlet hole and along an inlet air channel connecting to the aerosol generation chamber where the air mixes with vaporized precursor material to form a condensation aerosol. There is an outlet air channel connecting from the aerosol generation chamber to an outlet in the mouthpiece and the air drawn into the aerosol generation chamber as a user inhales on the mouthpiece continues along the outlet flow path to the mouthpiece outlet, carrying the aerosol with it, for inhalation by the user. Some electronic cigarettes may also include a flavor element in the air flow path through the device to impart additional flavors. Such devices may sometimes be referred to as hybrid devices, and the flavor element may, for example, include a portion of tobacco arranged in the air flow path between the aerosol generation chamber and the mouthpiece such that aerosol/condensation aerosol drawn through the device passes through the portion of tobacco before exiting the mouthpiece for user inhalation.

Some aerosol delivery systems comprise an airflow sensor. This is generally used to detect user inhalation on a mouthpiece of the device, and may comprise a pressure sensor or an acoustical sensor such as a microphone. The airflow sensor will typically be housed within a sensor cavity/sensor chamber of a sensor housing, with one or more openings to permit pressure variations in an airflow path of the device to be transmitted to the sensor cavity/chamber, where they can be detected by the airflow sensor. The airflow sensor is generally used to actuate a supply of power to an aerosol generator, and may either be directly situated on an electrical path supplying electrical power from a power source to the aerosol generator, or may provide a signal to a controller, with a supply of power from the power source to the aerosol generator being controlled by the controller in dependence on the signal received from the airflow sensor. In other cases the airflow sensor may not be directly used to control actuation of power to the aerosol generator.

Airflow sensors can be sensitive to contamination by liquid or other contaminants. Accordingly, when an airflow sensor is provided to detect airflow in an airflow channel of the aerosol delivery system, it is desirable to protect the airflow sensor from coming into contact with aerosol or liquid (such as condensed aerosol, or liquid leaking from a reservoir in the system) which may be present in the airflow channel.

Various approaches are described herein which seek to help address or mitigate at least some of the issues discussed above.

SUMMARY

According to certain embodiments of the disclosure there is provided an aerosol delivery system comprising an airflow sensor in a sensor chamber defined by one or more chamber walls and a deformable membrane attached to at least one of the one or more chamber walls, wherein the membrane is attached to the one or more chamber walls over more than half of its surface area.

According to certain other embodiments of the disclosure there is provided a sensor housing for an airflow sensor in an aerosol delivery system, the sensor housing comprising a sensor chamber defined by one or more chamber walls and a deformable membrane attached to at least one of the one or more chamber walls, wherein the membrane is attached to the one or more chamber walls over more than half of its surface area.

According to certain other embodiments of the disclosure there is provided a method of manufacturing a sensor housing for an airflow sensor in an aerosol delivery system, the method comprising the steps of; providing a sensor housing comprising a sensor chamber defined by one or more chamber walls; and attaching a membrane to at least one of the one or more chamber walls; wherein the membrane is attached to the one or more chamber walls over more than half of its surface area.

According to certain other embodiments of the disclosure there is provided an aerosol delivery system means, comprising airflow sensor means in a sensor chamber means defined by one or more chamber wall means and deformable membrane means attached to at least one of the one or more chamber wall means, wherein the membrane means is attached to the one or more chamber wall means over more than half of its surface area.

It will be appreciated that features and aspects of the disclosure described above in relation to the first and other aspects of the disclosure are equally applicable to, and may be combined with, embodiments of the disclosure according to other aspects of the disclosure as appropriate, and not just in the specific combinations described above.

BRIEF DESCRIPTION OF THE DRAWINGS

Embodiments of the disclosure will now be described, by way of example only, with reference to the accompanying drawings, in which.

DETAILED DESCRIPTION OF THE DRAWINGS

Figure 1:
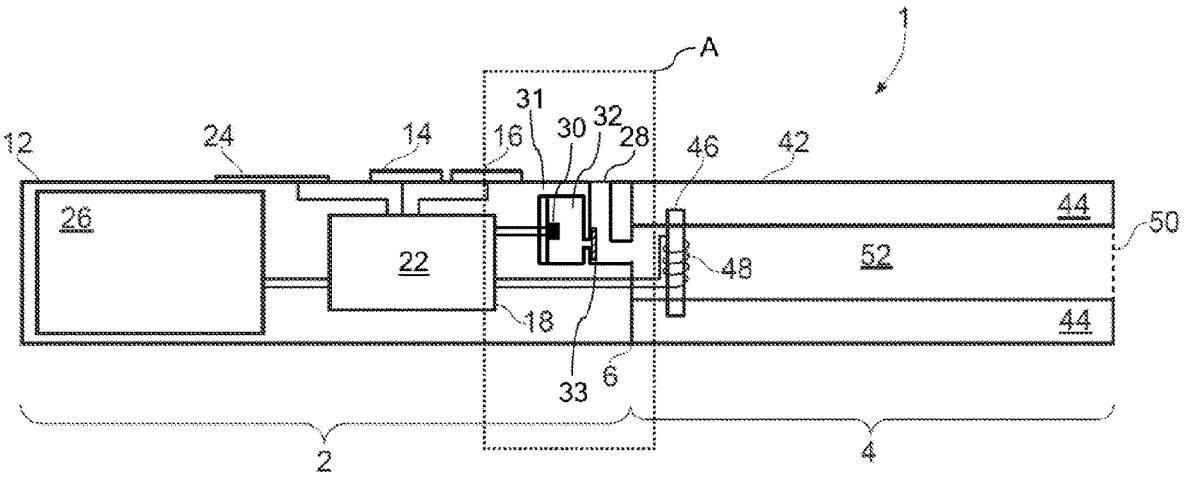
FIG. 1 is a schematic diagram of an aerosol delivery device in accordance with some embodiments of the disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to aerosol delivery systems (which may also be referred to as vapor delivery systems) such as nebulizers or e-cigarettes. Throughout the following description the term "e-cigarette" or "electronic cigarette" may sometimes be used, but it will be appreciated this term may be used interchangeably with aerosol delivery system/device and electronic aerosol delivery system/device. Furthermore, and as is common in the technical field, the terms "aerosol" and "vapor", and related terms such as "vaporize", "volatilize" and "aerosolize", may generally be used interchangeably.

Aerosol delivery systems (e-cigarettes) often, though not always, comprise a modular assembly including both a reusable part and a replaceable (disposable) cartridge part. Often the replaceable cartridge part will comprise the aerosol generating material and the vaporizer and the reusable part will comprise the power supply (e.g., rechargeable power source) and control circuitry. It will be appreciated these different parts may comprise further elements depending on functionality. For example, the reusable device part will often comprise a user interface for receiving user input and displaying operating status characteristics, and the replaceable cartridge part in some cases comprises a temperature sensor for helping to control temperature. Cartridges are electrically and mechanically coupled to a control unit for use, for example using a screw thread, bayonet, or magnetic coupling with appropriately arranged electrical contacts. When the aerosol generating material in a cartridge is exhausted, or the user wishes to switch to a different cartridge having a different aerosol generating material, a cartridge may be removed from the control unit and a replacement cartridge attached in its place. Devices conforming to this type of two-part modular configuration may generally be referred to as two-part devices.

It is common for electronic cigarettes to have a generally elongate shape. For the sake of providing a concrete example, certain embodiments of the disclosure described herein will be taken to comprise this kind of generally elongate two-part device employing disposable cartridges. However, it will be appreciated the underlying principles described herein may equally be adopted for different aerosol delivery system configurations, for example single-part devices or modular devices comprising more than two parts, refillable devices and single-use disposable devices, as well as devices conforming to other overall shapes, for example based on so-called box-mod high performance devices that typically have a more boxy shape. More generally, it will be appreciated certain embodiments of the disclosure are based on aerosol delivery systems which are operationally configured to provide functionality in accordance with the principles described herein and the constructional aspects of the aerosol delivery systems configured to provide the functionality in accordance with certain embodiments of the disclosure is not of primary significance.

FIG. 1 is a cross-sectional view through an example aerosol delivery system 1 in accordance with certain embodiments of the disclosure. The aerosol delivery system 1 comprises two main components, namely a reusable part 2 and a replaceable/disposable cartridge part 4. In normal use the reusable part 2 and the cartridge part 4 are releasably coupled together at an interface 6. When the cartridge part is exhausted or the user simply wishes to switch to a different cartridge part, the cartridge part may be removed from the reusable part and a replacement cartridge part attached to the reusable part in its place. The interface 6 provides a structural, electrical and airflow path connection between the two parts and may be established in accordance with conventional techniques, for example based around a screw thread, magnetic or bayonet fixing with appropriately arranged electrical contacts and openings for establishing the electrical connection and airflow path between the two parts as appropriate. The specific manner by which the cartridge part 4 mechanically mounts to the reusable part 2 is not significant to the principles described herein, but for the sake of a concrete example is assumed here to comprise a magnetic coupling (not represented in FIG. 1). It will also be appreciated the interface 6 in some implementations may not support an electrical and/or airflow path connection between the respective parts. For example, in some implementations an aerosol generator may be provided in the reusable part 2 rather than in the cartridge part 4, or the transfer of electrical power from the reusable part 2 to the cartridge part 4 may be wireless (e.g., based on electromagnetic induction), so that an electrical connection between reusable part and the cartridge part is not needed. Furthermore, in some implementations the airflow through the electronic cigarette might not go through the reusable part so that an airflow path connection between the reusable part and the cartridge part is not needed. In some instances, a portion of the airflow path may be defined at the interface between portions of reusable part 2 and cartridge part 4 when these are coupled together for use.

The cartridge part 4 may in accordance with certain embodiments of the disclosure be broadly conventional. In FIG. 1, the cartridge part 4 comprises a cartridge housing 42 formed of a plastics material. The cartridge housing 42 supports other components of the cartridge part and provides the mechanical interface 6 with the reusable part 2. The cartridge housing is generally circularly symmetric about a longitudinal axis along which the cartridge part couples to the reusable part 2. In this example the cartridge part has a length of around 4 cm and a diameter of around 1.5 cm. However, it will be appreciated the specific geometry, and more generally the overall shapes and materials used, may be different in different implementations.

Within the cartridge housing 42 is a reservoir 44 that contains aerosol generating material. Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may comprise plant material such as tobacco. In some embodiments, the aerosol-generating material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid. The aerosol-generating material may comprise one or more active substances and/or flavors, one or more aerosol-former materials, and optionally one or more other functional material. The aerosol-former material may comprise one or more constituents capable of forming an aerosol. In some embodiments, the aerosol-former material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate. The one or more other functional materials may comprise one or more of pH regulators, coloring agents, preservatives, binders, fillers, stabilizers, and/or antioxidants. The aerosol-generating material may be present on or in a support, to form a substrate. The support may, for example, be or comprise paper, card, paperboard, cardboard, reconstituted material, a plastics material, a ceramic material, a composite material, glass, a metal, or a metal alloy.

In the example shown schematically in FIG. 1, a reservoir 44 is provided configured to store a supply of liquid aerosol generating material. In this example, the liquid reservoir 44 has an annular shape with an outer wall defined by the cartridge housing 42 and an inner wall that defines an airflow path 52 through the cartridge part 4. The reservoir 44 is closed at each end with end walls to contain the aerosol generating material. The reservoir 44 may be formed in accordance with conventional techniques, for example it may comprise a plastics material and be integrally molded with the cartridge housing 42.

The cartridge part further comprises an aerosol generator 48 located towards an end of the reservoir 44 opposite to the mouthpiece outlet 50. An aerosol generator is an apparatus configured to cause aerosol to be generated from the aerosol-generating material. In some embodiments, the aerosol generator is a heater configured to subject the aerosol-generating material to heat energy, so as to release one or more volatiles from the aerosol-generating material to form an aerosol. In some embodiments, the aerosol generator is configured to cause an aerosol to be generated from the aerosol-generating material without heating. For example, the aerosol generator may be configured to subject the aerosol-generating material to one or more of vibration, increased pressure, or electrostatic energy.

It will be appreciated that in a two-part device such as shown in FIG. 1, the aerosol generator may be in either of the reusable part 2 or the cartridge part 4. For example, in some embodiments, the aerosol generator 48 (e.g., a heater) may be comprised in the reusable part 2, and is brought into proximity with a portion of aerosol generating material in the cartridge 4 when the cartridge is engaged with the reusable part 2. In such embodiments, the cartridge may comprise a portion of aerosol generating material, and an aerosol generator 48 comprising a heater is at least partially inserted into or at least partially surrounds the portion of aerosol generating material as the cartridge 4 is engaged with the reusable part 2.

In the example of FIG. 1, a wick 46 in contact with a heater 48 extends transversely across the cartridge airflow path 52 with its ends extending into the reservoir 44 of a liquid aerosol generating material through openings in the inner wall of the reservoir 44. The openings in the inner wall of the reservoir are sized to broadly match the dimensions of the wick 46 to provide a reasonable seal against leakage from the liquid reservoir into the cartridge airflow path without unduly compressing the wick, which may be detrimental to its fluid transfer performance.

The wick 46 and heater 48 are arranged in the cartridge airflow path 52 such that a region of the cartridge airflow path 52 around the wick 46 and heater 48 in effect defines a vaporization region for the cartridge part 4. Aerosol generating material in the reservoir 44 infiltrates the wick 46 through the ends of the wick extending into the reservoir 44 and is drawn along the wick by surface tension/capillary action (i.e. wicking). The heater 48 in this example comprises an electrically resistive wire coiled around the wick 46. In the example of FIG. 1, the heater 48 comprises a nickel chrome alloy (Cr20Ni80) wire and the wick 46 comprises a glass fiber bundle, but it will be appreciated the specific aerosol generator configuration is not significant to the principles described herein. In use electrical power may be supplied to the heater 48 to vaporize an amount of aerosol generating material (aerosol generating material) drawn to the vicinity of the heater 48 by the wick 46. Vaporized aerosol generating material may then become entrained in air drawn along the cartridge airflow path from the vaporization region towards the mouthpiece outlet 50 for user inhalation.

As noted above, the rate at which aerosol generating material is vaporized by the vaporizer (heater) 48 will depend on the amount (level) of power supplied to the heater 48. Thus, electrical power can be applied to the heater to selectively generate aerosol from the aerosol generating material in the cartridge part 4, and furthermore, the rate of aerosol generation can be changed by changing the amount of power supplied to the heater 48, for example through pulse width and/or frequency modulation techniques.

The reusable part 2 comprises an outer housing 12 having with an opening that defines an air inlet 28 for the e-cigarette, a power source 26 (for example a battery) for providing operating power for the electronic cigarette, control circuitry 18 for controlling and monitoring the operation of the electronic cigarette, a first user input button 14, a second user input button 16, and a visual display 24.

The outer housing 12 may be formed, for example, from a plastics or metallic material and in this example has a circular cross section generally conforming to the shape and size of the cartridge part 4 so as to provide a smooth transition between the two parts at the interface 6. In this example the reusable part has a length of around 8 cm so the overall length of the e-cigarette when the cartridge part and reusable part are coupled together is around 12 cm. However, and as already noted, it will be appreciated that the overall shape and scale of an electronic cigarette implementing an embodiment of the disclosure is not significant to the principles described herein.

The air inlet 28 connects to an airflow path 51 through the reusable part 2. The reusable part airflow path 51 in turn connects to the cartridge airflow path 52 across the interface 6 when the reusable part 2 and cartridge part 4 are connected together. Thus, when a user inhales on the mouthpiece opening 50, air is drawn in through the air inlet 28, along the reusable part airflow path 51, across the interface 6, through the aerosol generation region in the vicinity of the aerosol generator 48 (where vaporized aerosol generating material becomes entrained in the air flow), along the cartridge airflow path 52, and out through the mouthpiece opening 50 for user inhalation.

The power source 26 in this example is rechargeable and may be of a conventional type, for example of the kind normally used in electronic cigarettes and other applications requiring provision of relatively high currents over relatively short periods. The power source 26 may be recharged through a charging connector in the reusable part housing 12, for example a USB connector.

First and second user input buttons 14, 16 may be provided, which in this example are conventional mechanical buttons, for example comprising a spring mounted component which may be pressed by a user to establish an electrical contact. In this regard, the input buttons may be considered input devices for detecting user input and the specific manner in which the buttons are implemented is not significant. The buttons may be assigned to functions such as switching the aerosol delivery system 1 on and off, and adjusting user settings such as a power to be supplied from the power source 26 to an aerosol generator 48. However, the inclusion of user input buttons is optional, and in some embodiments buttons may not be included.

A display 24 may be provided to give a user with a visual indication of various characteristics associated with the aerosol delivery system, for example current power setting information, remaining power source power, and so forth. The display may be implemented in various ways. In this example the display 24 comprises a conventional pixilated LCD screen that may be driven to display the desired information in accordance with conventional techniques. In other implementations the display may comprise one or more discrete indicators, for example LEDs, that are arranged to display the desired information, for example through particular colors and/or flash sequences. More generally, the manner in which the display is provided and information is displayed to a user using the display is not significant to the principles described herein. For example, some embodiments may not include a visual display and may include other means for providing a user with information relating to operating characteristics of the aerosol delivery system, for example using audio signaling, or may not include any means for providing a user with information relating to operating characteristics of the aerosol delivery system.

A controller 22 is suitably configured/programmed to control the operation of the aerosol delivery system to provide functionality in accordance with embodiments of the disclosure as described further herein, as well as for providing conventional operating functions of the aerosol delivery system in line with the established techniques for controlling such devices. The controller (processor circuitry) 22 may be considered to logically comprise various sub-units/circuitry elements associated with different aspects of the operation of the aerosol delivery system 1. In this example the controller 22 comprises power supply control circuitry for controlling the supply of power from the power source 26 to the aerosol generator 48 in response to user input, user programming circuitry 20 for establishing configuration settings (e.g. user-defined power settings) in response to user input, as well as other functional units/circuitry associated functionality in accordance with the principles described herein and conventional operating aspects of electronic cigarettes, such as display driving circuitry and user input detection circuitry. It will be appreciated the functionality of the controller 22 can be provided in various different ways, for example using one or more suitably programmed programmable computer(s) and/or one or more suitably configured application-specific integrated circuit(s)/circuitry/chip(s)/chipset(s) configured to provide the desired functionality.

Reusable part 2 comprises an airflow sensor 30 which is electrically connected to the controller 22. In most embodiments, the airflow sensor 30 comprises a so-called "puff sensor", in that the airflow sensor 30 is used to detect when a user is puffing on the device. In some embodiments, the airflow sensor comprises a switch in an electrical path providing electrical power from the power source 26 to the aerosol generator 48. In such embodiments, the airflow sensor 30 generally comprises a pressure sensor configured to close the switch when subjected to an particular range of pressures, enabling current to flow from the power source 26 to the aerosol generator 48 once the pressure in the vicinity of the airflow sensor 30 drops below a threshold value. The threshold value can be set to a value determined by experimentation to correspond to a characteristic value associated with the initiation of a user puff. In other embodiments, the airflow sensor 30 is connected to the controller 22, and the controller distributes electrical power from the power source 26 to the aerosol generator 48 in dependence of a signal received from the airflow sensor 30 by the controller 22. The specific manner in which the signal output from the airflow sensor 30 (which may comprise a measure of capacitance, resistance or other characteristic of the airflow sensor, made by the controller 22) is used by the controller 22 to control the supply of power from the power source 26 to the aerosol generator 48 can be carried out in accordance with any approach known to the skilled person.

In the example shown in FIG. 1, the airflow sensor 30 is mounted to a printed circuit board 31 as described further herein, but this is not essential. The airflow sensor 30 may comprise any sensor which is configured to determine a characteristic of airflow in an airflow path 51 disposed between air inlet 28 and mouthpiece opening 50, for example a pressure sensor or transducer (for example a membrane or solid-state pressure sensor), a combined temperature and pressure sensor, or a microphone (for example an electret-type microphone), which is sensitive to changes in air pressure, including acoustical signals. The airflow sensor is situated within a sensor cavity 32, which comprises the interior space defined by one or more chamber walls 34. The sensor cavity 32 may also be referred to herein as a sensor chamber 32 (these terms may be used interchangeably), and comprises a region internal to one or more chamber walls 34 in which an airflow sensor 30 can be fully or partially situated. In some embodiments, the airflow sensor 30 is mounted to a printed circuit board (PCB) 31, which comprises one of the chamber walls of a sensor housing comprising the sensor chamber/cavity 32. A deformable membrane 33 is disposed across an opening communicating between the sensor cavity 32 containing the sensor 30, and a portion of the airflow path disposed between air inlet 28 and mouthpiece opening 50. The deformable membrane 33 covers the opening, and is attached to one or more of the chamber walls according to approaches described further herein.

Figure 2:
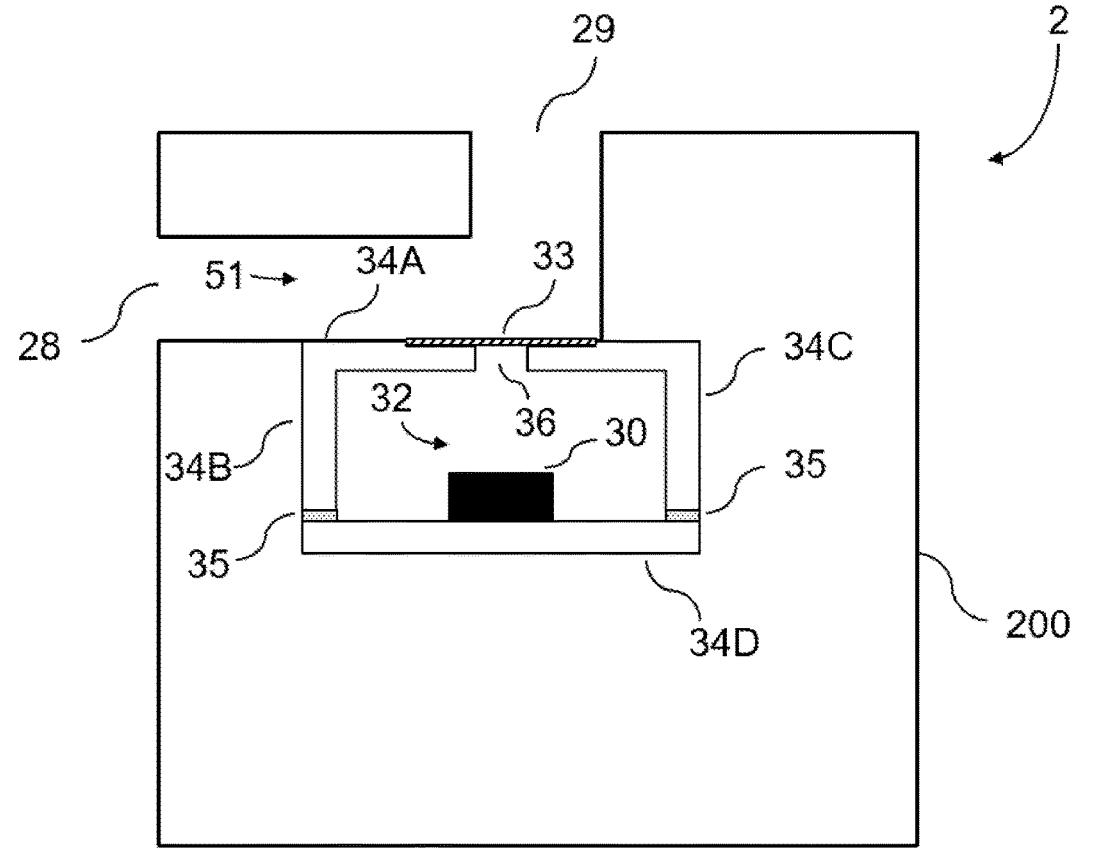
FIG. 2 is a schematic diagram of an airflow sensor arrangement in a reusable part 4 of the aerosol delivery device showing a detail view of the region marked 'A' in FIG. 1.

FIG. 2 shows in schematic form a detail view of the section marked 'A' in FIG. 1. Only a portion of the reusable part 2 of the aerosol delivery device 1, proximal to the interface 6, is shown. An airflow path 51 is shown communicating between an air inlet 28 and an air outlet 29 of the reusable part 2. The air outlet 29 is configured to communicate with an air inlet of the removable cartridge part 4 of the aerosol delivery device when the reusable part 2 and the cartridge part 4 are coupled together for use. Accordingly, when the reusable part 2 and the cartridge part 4 are coupled together for use, airflow path 51 of the reusable part and airflow path 52 of the cartridge part 4 form connected segments of an airflow path communicating between air inlet 28 and mouthpiece outlet 50. During use of the aerosol delivery device 1, user inhalation at the mouthpiece opening 50 induces a pressure drop in the entire airflow path communicating between air inlet 28 and mouthpiece outlet 50, including the airflow path segment, causing air to enter air inlet 28, pass through airflow paths 51 and 52, and out of the mouthpiece outlet 50.

An airflow sensor 30 is situated within a sensor chamber/cavity 32, which comprises a space internal to chamber walls 34A, 34B, 34C and 34D. An opening 36 through a chamber wall 34A communicates between the sensor chamber and the airflow path 51. In some embodiments, a chamber wall 34D comprises a PCB to which the airflow sensor 30 is mounted. A plurality of chamber walls 34 defining a sensor chamber may be considered to comprise an airflow sensor housing, and an airflow sensor housing may in turn comprise two or more sensor housing portions, each of which comprises one or more chamber walls. For example, in the example shown schematically in FIG. 2, chamber walls 34A, 34B and 34C comprise a first integrally formed sensor housing portion which is joined to a second sensor housing portion comprising chamber wall 34D. The chamber walls 34 may comprise a plastics material and/or a metallic material or a mixture of both. For example, the chamber walls 34 may be formed from a rigid plastics material, or a resilient plastics material such as silicone rubber. A sensor housing or sensor housing portion comprising one or more chamber walls may be integrally formed via a thermal molding or thermo-forming process, such as injection molding or blow molding, or via a machining process, for example, by machining a sensor chamber cavity 32 and opening 36 from a block of material. A sensor housing portion comprising a plurality of separate chamber walls 34 may be formed by joining the constituent chamber walls 34 using suitable joining processes. For example, chamber walls 34 formed separately by molding and/or machining processes described herein may be joined using adhesive bonding (e.g., using an appropriate polymer cement), using thermal joining (e.g. laser welding), or using mechanical fastenings (e.g. clips, screws, or cooperating mechanical latching elements formed in the chamber walls). A sealing member 35 such as a gasket element may be sandwiched in a join between two or more chamber walls to provide liquid- and air-tightening of the chamber cavity 32. In some embodiments, one or more chamber walls 34 comprise a metallic material, and are either integrally formed or joined together according to suitable approaches, such as those set out above.

In the example shown schematically in FIG. 2, a sensor housing portion comprising chamber walls 34A, 34B and 34C, formed according to approaches set out above, is joined to a chamber wall 34D comprising a PCB. An airflow sensor 30 is mounted to the PCB, for instance, via soldering. The chamber walls 34B and 34C may be attached to the PCB using an adhesive, using a thermal joining approach (such as laser welding), and/or using mechanical fastenings. For example, chamber walls 34B and 34C of FIG. 2 may be provided with latching portions (not shown) which engage the base of the PCB and bias it into contact with end faces of the chamber walls 34B and 34C. In in some embodiments, one or more separate mechanical fasteners (not shown), such as a mechanical fastener 60 as described further herein, may clamp the sensor housing portion comprising chamber walls 34A, 34B and 34C against a PCB comprising chamber wall 34D. In some embodiments, a sensor housing portion comprising chamber walls 34A, 34B and 34C, and a PCB comprising chamber wall 34D, are introduced into the housing 200 of the reusable part 2 along with other components (such as a power source 26 and controller 22) during manufacture of the reusable part 2, such that other components of the reusable part 2, once fitted, urge the PCB 34D into contact with the sensor housing portion comprising chamber walls 34A, 34B and 34C when the reusable part 2 is assembled. Whether bonding or mechanical attachment or both are used to attach the other chamber walls 34 to the PCB comprising chamber wall 34D, a sealing element 35 such as a gasket or O-ring made of resilient material (for example, silicone rubber) may be introduced into the join where the PCB contacts the other chamber walls to substantially liquid- and gas-tighten the sensor chamber 32.

A membrane 33 is attached to one or more of the chamber walls 34, and forms an interface between the sensor chamber 32 and the airflow path 51. FIG. 2 shows a membrane 33 attached to an exterior surface of a chamber wall 34A, an outer surface of which comprises a portion of the internal surface of airflow path 51. An opening 36 in chamber wall 34A communicates between the sensor chamber 32 and the airflow path 51 via the membrane 33. As set out further herein, prior to attachment of the membrane 33, the chamber walls 34 are in general formed and/or joined together in such a manner that the sensor chamber 32 is substantially liquid- and air-tightened apart from the opening 36. In the example of FIG. 2, a peripheral portion of membrane 33 is attached to the chamber wall 34A such that it overlaps a surface portion surrounding the opening 36. In some embodiments, the membrane 33 is attached to the chamber wall 34A over a planar contact interface using either adhesive or thermal bonding. For example, in some embodiments, the membrane 33 is bonded to the chamber wall 34A using an adhesive, such as a polymer cement. In some embodiments, the membrane 33 is bonded to the chamber wall 34A using a thermal joining process, such as by stamping the membrane onto the chamber wall 34A using a heated die, or by laser welding the membrane 33 onto the chamber wall 34A. The attachment surfaces of the membrane 33 and/or the chamber wall 34A may be provided with surface treatments to enhance the bond between the membrane 33 and the chamber wall 34A.

The membrane 33 is formed of a resilient material, enabling it to deform under the influence of pressure changes in airflow path 51, and communicate these pressure changes to the cavity 32 where they can be sensed by the membrane. Under the influence of a pressure drop in the airflow path 51, the portion of the membrane overlying the opening 36 will be deflected upwards, reducing the pressure in the sensor chamber 32. In some scenarios, the elasticity of the membrane is sufficient that during a user puff, the pressure in the airflow path 51 and the pressure in the sensor chamber 32 becomes equalized. However, this is not essential, provided the membrane is able to deform to a sufficient degree to cause a large enough pressure drop in the sensor chamber 32 to be detected by the airflow sensor 30.

The membrane 33 may comprise a liquid-impermeable material, such as a plastics material or metallic material, which may help prevent liquid which may be present in airflow path 51 from ingressing/entering the sensor chamber 32 and contaminating the sensor 30. The membrane 33 may comprise a natural or synthetic rubber material, for example a silicone rubber material. The membrane may comprise a metallic material, for example, a metallic foil comprising aluminum or copper. In some embodiments, the membrane comprises a laminate formed of two or more layers of materials. The membrane 33 may comprise a fibrous material such as a woven or non-woven sheet, treated to render it impermeable to liquid. In one example the membrane material may be PUW867 (comprising layers of PET and ePTFE) from Dongguan PUE EPTFE Material Co. Limited, China. The thickness of the membrane 33 may be selected to provide a suitable degree of stiffness such that a deflection of the membrane under the characteristic pressure differential induced between the airflow path 51 and the sensor chamber 32 during a user puff causes a pressure change within the sensor chamber 32 which can be detected by the sensor 30. The appropriate thickness will therefore depend on the sensitivity of the sensor 30. In some embodiments, the membrane 33 has a thickness of between 0.2 and 0.3 mm, for example, comprising a PUW867 membrane with a thickness of 0.2 mm, 2.5 mm or 0.3 mm. However, these thicknesses values are exemplary and a suitable thickness for a given airflow sensor 30, membrane material, and shape and size of opening 36, can in practice be determined via experimentation and/or modelling.

The size and shape of membrane 33 are selected relative to the size and shape of opening 36 such that the membrane 33 is attached to one or more chamber walls 34 over at least half of its surface area. In the example of FIG. 2, the membrane 33 is attached to the chamber wall 34A such that over 50% of the surface area of the lower surface of the membrane 33 is in contact with the outer surface of chamber wall 34A. Attaching a membrane 33 over at least 50% of the membrane surface has been found to improve the attachment between the membrane 33 and the chamber wall(s) 34 to which the membrane is attached. As shown in FIG. 2, the chamber wall 34A to which the membrane 33 is attached is optionally provided with an annular recessed portion surrounding the aperture 36, which is sized to receive the membrane 33. The depth of the recessed portion relative to the surrounding outer surface of chamber wall 34A may be less than the thickness of the membrane 33, the same as the thickness of the membrane 33, or deeper than the thickness of the membrane 33. The footprint of the recess is generally matched to the shape of the membrane 33, which may aid in locating the membrane 33 in position over the opening 36 during assembly of the aerosol delivery system 1.

The thickness and material properties of the membrane 33 are selected based on the requirement to enable coupling and/or equalization of pressure between the airflow path 51 and the sensor chamber 32. It will be appreciated that the coupling of pressure between the sensor chamber 32 and the airflow path 51 depends on the material properties of the membrane 33 itself, its thickness, and the shape and cross-sectional area of the opening 36. Depending on the sensitivity of the sensor, it may not be necessary for the pressure in the cavity 32 to fully equalize with the pressure in the airflow path 51 during a puff. Accordingly, the thickness, area and resilient properties of the membrane 33 may provide a buffering effect, attenuating the pressure change induced in the sensor chamber 32 by a certain pressure change in the airflow path 51, and preventing damage to the sensor 30 which might result from exposure to an excessive pressure differential. In general, specifying a thicker, stiffer membrane to cover a smaller opening will provide greater buffering, and specifying a thinner, more compliant membrane to cover a larger opening will provide less buffering. Selection of suitable size, material properties and thickness for the membrane 33 can be established through empirical testing and/or modelling. For the sake of providing a specific example, in one embodiment the membrane comprises a circular film of PUW867 with a thickness of around 0.15 mm, a radius of around 2.4 mm (and hence a surface area of around 18.1 mm$^2$), and covers a circular opening 36 with a radius of around 1.5 mm (and hence a surface area of around 7.1 mm$^2$) in a chamber wall 34. This means the membrane overlaps the chamber wall over an area of around 11 mm$^2$, which is around 61% of the membrane's surface area. Of course, other materials and geometries will other amounts of overlap may be used in other examples.

Figure 3:
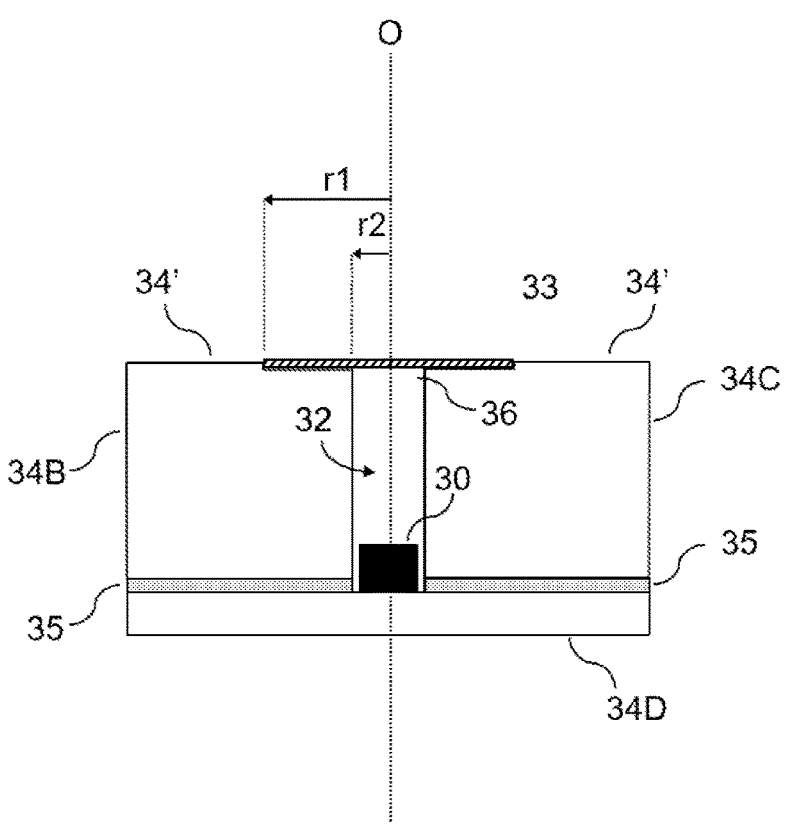
FIG. 3 is a schematic diagram of an airflow sensor arrangement with an alternative chamber wall configuration.

In the embodiments described above, the opening 36 between the sensor chamber 32 and the airflow path 51 is defined in an upper chamber wall 34A, with the membrane 33 attached so as to be co-planar with a major surface of the chamber wall 34A. However, in other instances there may be different attachment orientations between the membrane 33 and the chamber wall(s) 34. FIG. 3 will be recognized from FIG. 2, and shows sensor walls 34, a membrane 33, an airflow sensor 30, and a sealing element 35. The housing 200 of the reusable part is not shown. In the embodiment of FIG. 3, the sensor chamber 32 is defined by chamber walls 34B and 34C, each of which is attached at a bottom end to a chamber wall 34D comprising a PCB, with a sealing element 35 interposed between PCB and the other chamber walls 34. The ends of chamber walls 34B and 34C which face away from the PCB 34D define a membrane attachment surface 34', to which the membrane 33 is attached. In this arrangement, a sensor housing portion comprised by chamber walls 34B and 34C may be considered to comprise a block, and the sensor chamber 32 defines a well in the block. The thickness of the chamber walls 34A and 34B in the plane of the membrane may be larger than their height. The sensor chamber 32 generally has a diameter and cross-section which are equal to those of the opening 36, though this is not essential. The attachment of the membrane 33 to the attachment surface 34', and the attachment of the PCB 34D to the housing portion comprising chamber walls 34B and 34C, may be carried out in accordance with approaches detailed further herein for other embodiments. It will be appreciated that chamber walls 34B and 34C from this example may be substituted for a single continuous chamber wall, for instance comprising a cylindrical wall, with the membrane 33 being attached to one end face.

Figure 4:
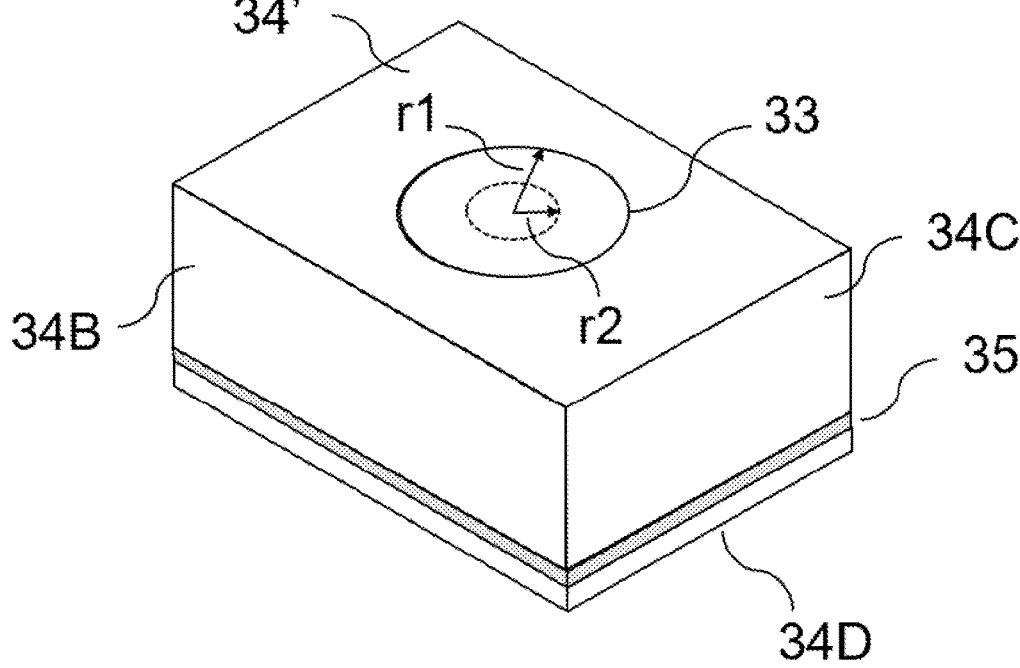
FIGS. 4, 5 and 6 are a schematic diagrams of membrane geometries for an airflow sensor arrangement.

The membrane 33 and opening 36 may be configured with a wide range of shapes and sizes, provided the membrane 33 can be attached to a surface of a chamber wall 34 over at least 50% of its surface area. FIG. 4 shows a three-dimensional perspective view of a first embodiment of a sensor housing comprising chamber walls 34A, 34B, 34C and 34D, with a sealing element 35 disposed between a sensor housing comprising chamber walls 34A, 34B, 34C and a PCB comprising chamber wall 34D. In this respect, FIG. 4 represents a three-dimensional view of a sensor housing as shown in FIGS. 1 to 3. A membrane attachment surface 34' may comprise an upper/outer surface of a chamber wall, such as the chamber wall 34A shown in the example of FIG. 2, or may comprise the end surface(s) of one or more chamber walls, such as the chamber walls 34B and 34C shown in the example of FIG. 3. A circular membrane 33 is attached to the attachment surface 34' according to any of the approaches set out further herein. As shown in FIGS. 3 and 4, the membrane 33 has a radius r1, and covers a circular opening 36 (indicated via a dashed line in FIG. 4)), of radius r2. In FIG. 3, r1 and r2 are indicated relative to a centerline O passing through the midpoint of opening 36. As described further herein, an annular recessed portion (not shown)

surrounds the circular opening 36, in which the membrane 33 is received. The annular recessed portion has a major radius of r1, matching that of the membrane 33. Significantly, r1 is sized relative to r2 such that the overlap of the membrane 33 with the recessed portion comprises at least 50% of the surface area of one side of the membrane.

Figure 5:
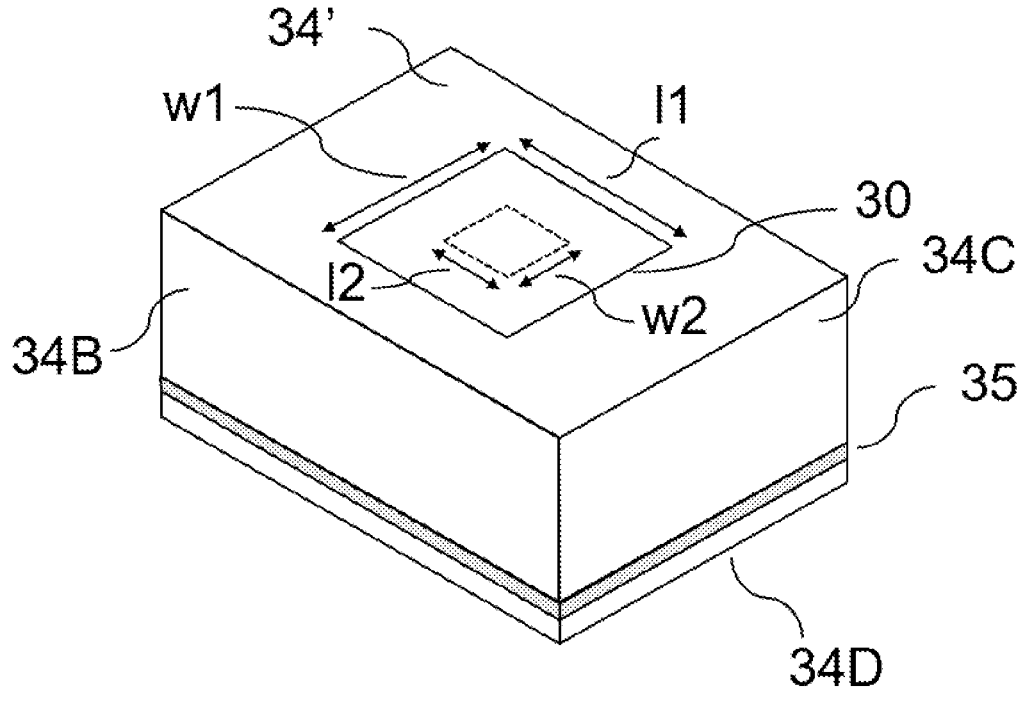

FIG. 5 shows a three-dimensional perspective view of a second embodiment of a sensor housing which will be recognized from FIG. 4. However, in this embodiment the membrane 33 is a quadrilateral with a width w1 and a length l1, and covers a quadrilateral opening 36 (indicated via a dashed line) with a width w2 and length l2, as indicated on FIG. 5. As described above, there is a recessed portion (not shown) surrounding the opening 36 in which the membrane 33 is received, the recessed portion being sized to match the membrane 33. As in other embodiments, the membrane 33 is attached to the chamber wall 34A over at least half of the surface area of one major surface (i.e. w1, w2, l1 and l2 are selected to provide an overlap whereby at least 50% of one side of membrane 33 contacts a membrane attachment surface 34' of chamber wall(s) 34 which it is attached).

Figure 6:
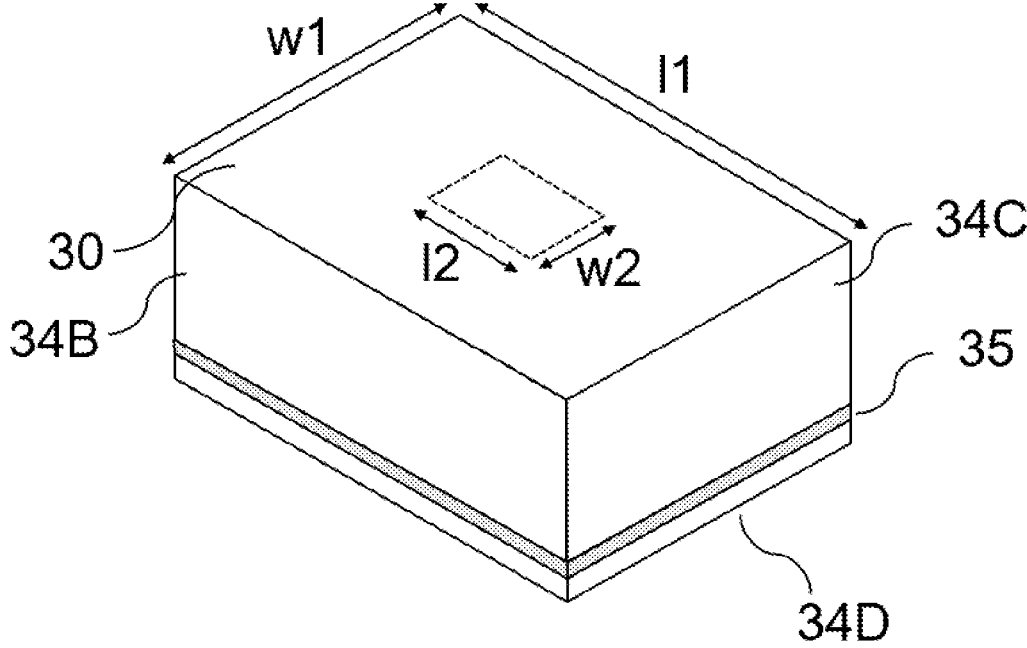

FIG. 6 shows a three-dimensional perspective view of a third embodiment of a sensor housing which will be recognized from FIGS. 4 and 5. In this embodiment the membrane 33 covers the entirety of the external surface of chamber wall 34A. The membrane covers an opening 36 (indicated via a dashed line) in chamber wall 34A, the opening having a width w2 and length l2. The opening 36 may be any shape. What is significant is that as in other embodiments, the membrane 33 is attached to the chamber wall 34A over at least half of the surface area of one major surface (i.e. w1, w2, l1 and l2 are selected to provide an overlap whereby at least 50% of one side of membrane 33 contacts a membrane attachment surface 34' of chamber wall(s) 34 which it is attached).

Figure 7:
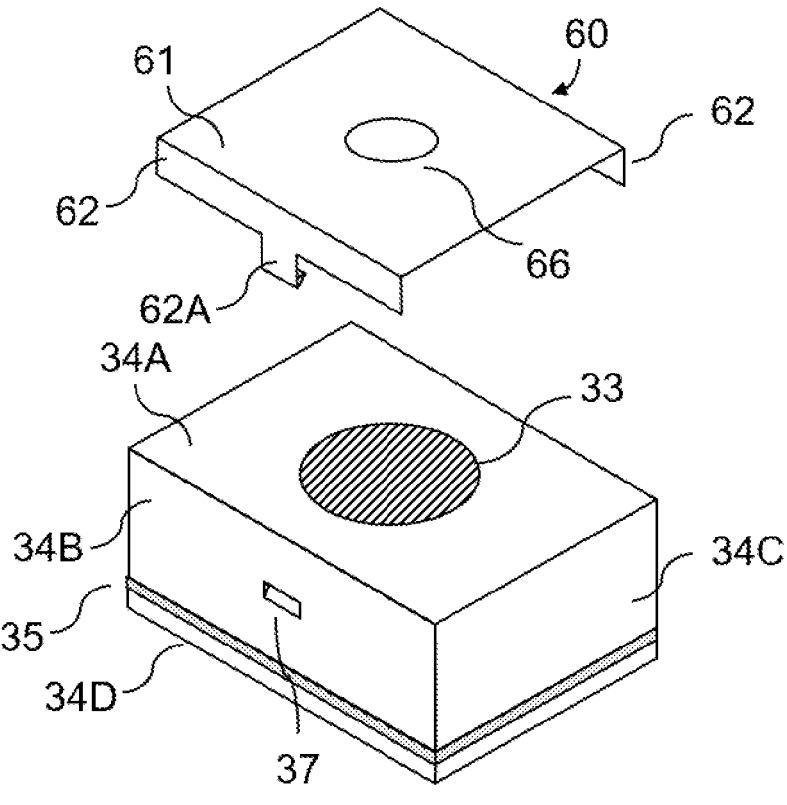
FIGS. 7 and 8 are schematic diagrams of a mechanical fastener arrangement for securing a membrane to a chamber wall of an airflow sensor arrangement.

In some embodiments, the membrane 33 is mechanically attached to one or more chamber walls 34 using one or more mechanical fastening elements 60. FIG. 7 shows a three-dimensional perspective view of a first embodiment of a sensor housing comprising chamber walls 34A, 34B, 34C and 34D, with a sealing element 35 disposed between the sensor housing comprising chamber walls 34A, 34B, 34C and a PCB comprising chamber wall 34D. In this respect, the sensor housing of FIG. 7 can be considered the same as those shown in FIGS. 4 to 6, aside from the modifications described further herein. As in other embodiments, a membrane 33 covers an opening 36 (not shown) into the interior of the sensor chamber 32. In this example, the membrane 33 is circular, however, it may comprise any geometry set out herein, such as those shown in FIGS. 4 to 6. As in other embodiments, what is significant is that at least 50% of the surface of the membrane 33 contacts one or more chamber walls surrounding the opening 36. The membrane 33 is located in an annular recess in a chamber wall 34A, surrounding the opening 36. A mechanical fastener 60 is provided, which is configured to urge the membrane 33 into contact with the base of the recess when the mechanical fastener 60 is engaged with one or more of the chamber walls 34. In the embodiment shown in FIG. 7, the fastener comprises a face portion 61, with tab portions 62 extending orthogonally from two opposing edges of the face portion 61. The spacing of the tab portions 62 matches the width of chamber wall 34A, such that the planar tab portions 62 are aligned with, 26 respectively, the outer surface of chamber wall 34B, and an opposing chamber wall (not shown). Latching elements 62A are provided on the planar tab portions, which are shaped to engage corresponding latching elements 37 on the chamber walls 34. The latching elements can comprise any geometry known to the skilled person, for example, an arrangement with lugs on a first one of the chamber wall(s) or mechanical fastener 60, which lock into matching recesses on a second one of the chamber wall(s) or mechanical fastener 60. For the sake of a concrete example, in FIG. 7, a latching element 37A comprising a slot is shown on the outer surface of chamber wall 34B, into which a latching element 62A comprising a lug on the mechanical fastener 60 can be engaged. A further latching element (not shown) is disposed on a chamber wall opposite chamber wall 34B. The latching arrangement may be reversible/releasable, or may be such that the mechanical fastener 60 cannot be non-destructably disengaged from the chamber wall(s). The engagement of each latching element 62A with a corresponding latching element 37 secures the mechanical fastener 60 to the sensor housing portion comprising chamber walls 34A, 34B and 34C. During assembly, and prior to engagement of the mechanical fastener 60 with the chamber walls, the membrane 33 is located in position within the recess surrounding opening 36. The membrane may be attached to chamber wall 34A using adhesive, or a thermal bonding process as described further herein. Alternatively, the membrane may not be bonded or otherwise attached to the chamber walls aside from the attachment provided by the mechanical fastener 60. During assembly, the mechanical fastener 60 is engaged over the membrane 33, urging it into contact with the base of the recess. The depth of the recess is generally configured to be less than the thickness of the membrane 33, such that, as a lower face of the planar face portion 61 of the mechanical fastener 60 is brought towards the chamber wall 34A, it first contacts the membrane 33, compressing it against the base of the recess. The positions of the latching elements 37 on the chamber walls 34 and the latching elements 62A on the mechanical faster 60 are selected such that when the mechanical fastener 60 is urged into contact with the membrane 33, the latching elements 62A of the mechanical fastener 60 engage the latching elements 37 in the chamber walls 34 so as to maintain a compressive loading of the underside of planar face portion 61 against the upper surface of the membrane 33. This compressive loading may be provided by the resilience of the membrane 33, the resilience of the chamber walls 34, the resilience of the mechanical fastener 60, or a combination of the above.

Figure 8:
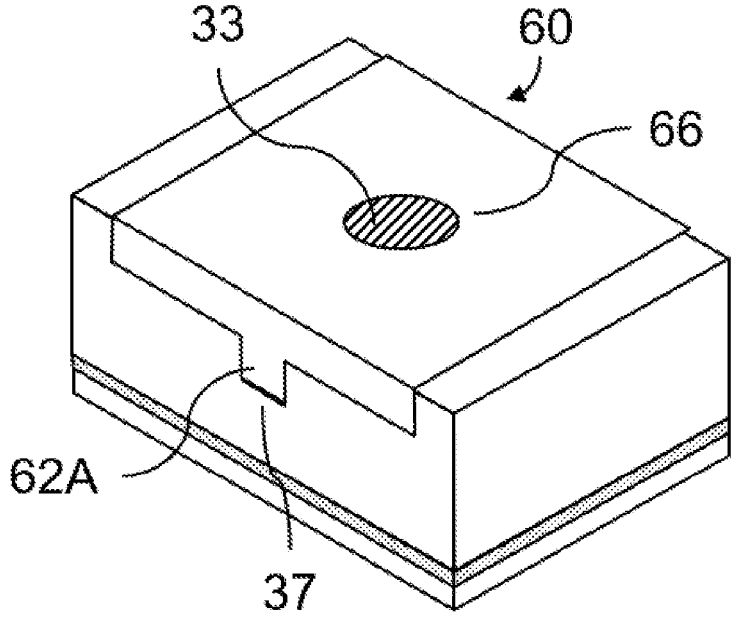

At least one aperture 66 is provided in the face portion 61 of the mechanical fastener 60, which is located such that it reveals a portion of the membrane 33 when the mechanical fastener 60 is engaged with the chamber walls 34. In some embodiments, the cross-section of the aperture 66 matches that of the opening 36 which is covered by the membrane 33, however this is not essential provided the aperture 66 has at least a partial overlap with the opening 36 to enable pressure changes in airflow path 51 to be transmitted to the sensor chamber 32 via the membrane 33. In many cases the aperture 66 is shaped and sized such that when the mechanical fastener 60 is engaged with the chamber walls 34, the periphery of the aperture 66 aligns with the periphery of the opening 36 in the chamber wall 34 over which the membrane 33 is attached. In general, the aperture 66 is sized relative to the membrane 33 and the opening 36 such that at least 50% of the surface area of the membrane 33 is in contact with the underside of the planar face portion 61 when the mechanical fastener 60 is engaged with the chamber walls 34. FIG. 8 will be recognized from FIG. 7, and shows the mechanical fastener 60 engaged with the chamber walls 34 via the engagement of latching elements 62A on the mechanical fastener 60 with corresponding latching elements 37 on the chamber walls 34. A circular portion of the membrane 33, corresponding to 50% or less than the surface area of the upper surface of the membrane 33, is revealed by the aperture 66 in the mechanical fastener.

Figure 9:
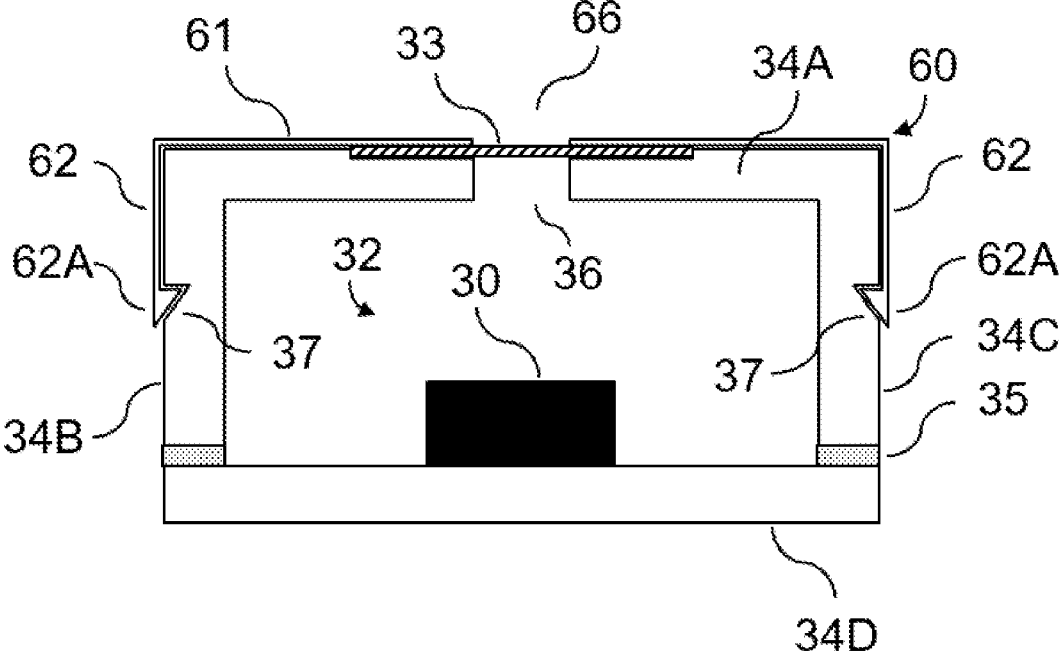
FIG. 9 is a schematic diagram showing a section view through the airflow sensor arrangement of FIG. 8.

FIG. 9 shows a section view through the arrangement of FIG. 8, sectioned along a plane passing through the center of the aperture 66 and the latching elements 37. The chamber wall arrangement will be recognized from FIG. 2, comprising an upper chamber wall 34A with an opening 36, side chamber walls 34B and 34C, and a basal chamber wall 34D, comprising a PCB, with a sealing element 35 between chamber walls 34B/34C and chamber wall 34D. Sensor 30 is mounted to the PCB, within the sensor chamber 32 comprising the space internal to the chamber walls 34. Chamber walls 34B and 34C comprise latching elements 37, shaped to engage with cooperating latching elements 62A defined on a tab portions 62 of the mechanical fastener. The spacing of the latching element 37 from the surface of the upper chamber wall 34A is sized to be similar to or slightly less than the spacing between the lower surface of the planar face portion 61 and the latching element 62A. The membrane is sized to protrude slightly from the recess around opening 36. Accordingly, when the mechanical fastener 60 is engaged onto the chamber wall 34A, the membrane 33 is compressed between the planar face portion 61 of mechanical fastener 60 and chamber wall 34, prior to the latching elements 62A of the mechanical fastener 60 engaging the latching elements 37 of the chamber walls 34. There may also be some deformation of the chamber walls 34 prior to engagement of the respective latching elements. This causes the membrane 33 to be held in compression against the chamber wall 34A when the mechanical fastener 60 is in the engaged configuration, providing a sealing effect which gas-tightens the sensor chamber 32. In some embodiments, the mechanical fastener 60 is provided with sprung portions (not shown) protruding from the planar face portion 61. In embodiments where the reusable part 2 and the cartridge 4 are magnetically coupled for use, such sprung portions can assist in partially counteracting the force of magnetic attraction, and may in some instances provide an electrical connection between the reusable part 2 and the cartridge 4.

The mechanical fastener 60 may comprise a plastics or metallic material. In some embodiments the mechanical fastener 60 is formed from a sheet of metallic material such as stainless steel or copper, and may be manufactured using stamping and folding processes known in the art. A metallic fastener may be heat treated using approaches known in the art to provide an optimal degree of resilience to provide the function of urging the membrane 33 against a chamber wall 34. The mechanical fastener may alternatively comprise a plastics material. It will be appreciated the specific design of the latching elements 62A and 37 respectively defined on the mechanical fastener and the chamber walls 34 may follow any design of latching element known to the skilled person. In embodiments wherein the membrane 33 is not attached to a chamber wall 34 using any additional adhesive or other bonding approaches, the latching element(s) will generally be specified to retain the mechanical fastener over the membrane with sufficient compressive force to provide gas-tight sealing of the membrane 33 against the chamber wall(s) 34. It will be appreciated that the geometries and number of the latching elements 37/62A shown in FIGS. 7 to 9 are exemplary, and a larger or smaller number of latching elements may be defined on each of the mechanical fastener 60 and the chamber walls 34.

It will be appreciated that a number of modifications may be made to the embodiments shown in FIGS. 1 to 9.

In some embodiments the sensor chamber 32 is not fully gas-tightened when the membrane 33 is attached. Providing venting of the sensor chamber 32 enables equalization of pressure between the sensor chamber 32 and the atmosphere by gas transfer. In some embodiments, such venting can be provided by making the membrane 33 semi-permeable to gas. In embodiments, the gas-permeability of the membrane is selected such that under the characteristic pressure drop in airflow path 51 induced by a user puff, there is negligible gas transfer across the membrane 33 over the characteristic timescale of a user puff. However, the gas-permeability of the membrane 33 is configured to allow pressure equalization via gas transfer across the membrane over longer timescales. Providing a membrane which provides gas transfer over a longer timescale than that of a user puff can avoid prolonged stress acting on the membrane 33 due to, for instance, changes in atmospheric pressure due to weather conditions, or changes in altitude (such as those induced by transporting the aerosol delivery device on an aircraft), by allowing stress on the membrane to be relieved. The configuration of the sensor walls 34 may also provide a similar venting effect. For instance, a gap may be left between two or more chamber walls to allow equalization of pressure via gas transfer over characteristic timescales longer than that of a user puff. In some embodiments a sealing element 35 between two or more chamber walls 35 may be partially permeable to gas, being formed of a porous and/or fibrous material. Such venting can be in addition to or in place of gas permeability of the membrane 33.

In some instances, a sealing element 35 may not be provided at the interface between a chamber wall 34 (which may or may not comprise a PCB) and surfaces of other chamber walls 34 of the sensor housing. In such cases, a chamber wall (which may comprise a PCB) may be directly attached to others of the chamber walls 34 via adhesive or mechanical fixings as described further herein. In other embodiments, the chamber walls 34 may not comprise a PCB. In such embodiments, the chamber walls 34 may be integrally formed with each other using processes described further herein. Alternatively, a plurality of sensor housing portions, each comprising one or more chamber walls 34, may be separately fabricated and joined together using adhesives, thermal bonding approaches, or mechanical fixation approaches described further herein. In embodiments where the chamber walls 34 do not comprise a PCB, the sensor 30 may be directly attached to the interior of one of the chamber walls 34, or mounted on a PCB fully located within sensor chamber 32. In such embodiments, electrical vias are generally provided through one or more sensor walls 34 to allow electrical connection of the airflow sensor 30 to the controller 22. The vias may be integrally molded with a chamber wall 34 through which they pass.

Where the airflow sensor 30 is mounted to a PCB which comprises a chamber wall 34A, the PCB may in some embodiments extend beyond the footprint defined by the contact of the PCB to the other chamber walls 34. IIn other words, a side of the PCB to which the other chamber walls 34 are attached may have a first surface region which forms an internal surface of the sensor chamber 32, a second surface region over which the PCB is attached to the other chamber walls 34, and a third surface region outside the sensor chamber 32, to which further components may be mounted of the aerosol delivery system 1 may be mounted. Accordingly, though FIGS. 1 to 9 have shown a PCB which is sized to match the footprint of a sensor housing portion comprising the remaining chamber walls 34, this is not essential. A substantial majority or all of the electrical components of the reusable part 2 (for instance the power source 26 and controller 22) may in some embodiments be mounted to the PCB housing the airflow sensor 30 (either inside or outside the sensor chamber 32). This may simplify assembly of the reusable part. In some embodiments, electrical components other than the airflow sensor 30 may be housed in the sensor chamber 32. In some embodiments, the opening 36 covered by the membrane 33 is provided in the PCB, and the membrane 33 is attached to the PCB according to membrane attachment approaches set out further herein.

It will be appreciated that the opening 36 and the membrane 33 may be shaped in a variety of different ways. Though circular and quadrilateral membranes/openings have been shown in the embodiments of FIGS. 1 to 9, any suitable shape can be selected which provides for at least a 50% overlap between the membrane 33 and the chamber wall(s) 34 to which it is attached. Though the opening 36 and the membrane 33 will generally be the same shape, with the membrane located such that its geometric center is aligned with the center of the opening, this is not essential. For example, a quadrilateral membrane may cover a round opening, and the membrane 33 may be offset from the center of opening 36. In general the diameter of the overlap region, defined as the shortest distance between the periphery of the membrane 33 and the periphery of the opening 36, will be relatively consistent around the membrane perimeter, as this reduces stress localization at the interface between the membrane 33 and the chamber walls 34 when a pressure differential is applied between the airflow path 51 and the sensor chamber 32.

Though the embodiments of FIGS. 1 to 9 have shown the membrane 33 located in a recess on a chamber wall 34, this is not essential. Provision of a recess can assist in location of the membrane 33 over the opening 36 during assembly of the reusable part 2, but the membrane 33 can also be attached to a surface of the chamber wall 34 such that it sits proud of the surrounding surface of the chamber wall 34. Though FIGS. 1 to 9 also show the membrane attached to an outer surface of a chamber wall 34 (i.e., a surface facing away from the sensor chamber 32) the membrane 33 may be attached to an internal face of a chamber wall 34 (i.e. an internal surface of sensor chamber 32). For example, in the example shown in FIG. 2, the membrane could equally be attached to the underside of chamber wall 34A, either with or without a recess being provided. Where a mechanical fastener 60 is used, this may be provided inside the sensor chamber 32, to urge the membrane 33 against an inner surface of a chamber wall 34.

In the examples shown in FIGS. 1 to 9, the chamber walls 34 have been shown as defining a generally cuboidal sensor housing. However, it will be appreciated that this geometry is illustrative, and the chamber walls 34 may comprise any geometry which fits within the housing 200 of the reusable part, enables the membrane 33 to be attached to one or more chamber walls 34, and which allows an outer surface of the membrane 33 to be in fluid communication with an airflow path through the aerosol delivery system 1. Accordingly, in some embodiments, the chamber walls 34 form a generally cylindrical sensor chamber housing. The chamber walls 34 in such a configuration may comprise a top chamber wall with an opening which is covered by the membrane, or may comprise an annular side chamber wall surrounding a well-shaped sensor chamber, with the membrane being attached to an end face of the side chamber wall (in a manner similar to that shown in FIG. 3). In some instances, the housing 200 of the reusable part 2 may comprise one or more chamber walls 34 of the sensor housing, and a portion of the internal space of the housing 200 may therefore comprise the sensor chamber 32.

Though FIGS. 1 to 9 have shown examples in which the chamber wall 34 to which the membrane is attached is planar, in other embodiments, the chamber wall to which the membrane 33 is attached may be curved or stepped, and when attached, the membrane 33 may conform to the curved chamber wall. In some embodiments, the membrane 33 is not planar, and may comprise a face portion and an annular portion which contacts an annular inner surface of opening 36, such that at least 50% of the surface area of membrane 33 is attached to the inner surface of the opening.

It will be appreciated that the airflow sensor 30 may be configured according to a variety of sensing principles. In some embodiments the airflow sensor comprises a pressure sensor. In some embodiments the airflow sensor comprises a microphone, which detects acoustic signals induced by inhalation. In other embodiments, rather than directly sensing pressure variations in sensor chamber 32, the airflow sensor 30 may sense the deflection of the membrane 33. For example, a surface of the membrane 33 may be coated with a conductive coating, comprising a first electrode of a capacitive sensor, with the airflow sensor 30 comprising a further electrode. A change in the degree of capacitive coupling between the membrane 33 and the airflow sensor 30 can be used to infer a change in the pressure of the airflow path 51. The physical deflection of the membrane 33 may be sensed by the airflow sensor 30 in other ways, for example, via optical sensing.

The membrane 33 can be situated at any location in the aerosol delivery device 1 which enables a pressure drop and/or acoustic signal in an airflow path 51/52 to be transmitted across the membrane into a sensor chamber 32. In FIG. 2, airflow path 51 is shown passing through a portion of the reusable part 2, but in other embodiments the airflow path 51 may be configured differently. For example, in some embodiments, the airflow path 51 is defined by the interface 6 between the reusable part 2 and the cartridge part 4. For instance, if the aerosol delivery system 1 is a 'pod mod' type device wherein a portion of the cartridge part 4 is inserted into a receiving recess of the reusable part for use, the airflow path 51 communicating between air inlet 28 and the inlet of the cartridge part 4 may comprise a space between an outer surface of the receiving recess on the reusable part and an outer surface of the portion of the cartridge part 4 which is received into the receiving recess. In such embodiments, the membrane 33 may be disposed on a chamber wall comprising an interior surface of a receiving recess on the reusable part, such as on the basal wall of the recess. With reference to FIGS. 2 to 9, the chamber wall 34A or attachment surface 34' to which the membrane is attached may comprise the basal surface of a recess into which a cartridge portion 4 is received. It will be further appreciated that the air inlet 28 may be comprised fully within the cartridge, with a port provided from the airflow path in the cartridge to communicate a pressure drop in the airflow path to the surface of a membrane 33 in the reusable part 2. It will be further appreciated that in other instances, the aerosol delivery system 1 will comprise a single-part device, and the chamber wall(s) 34 to which the membrane is attached may be situated at any location in the device which allows the outer surface of the membrane 33 to be in fluid communication with the airflow path through the device.

Thus there has been described an aerosol delivery system comprising an airflow sensor in a sensor chamber defined by one or more chamber walls and a deformable membrane having a surface area (i.e. the areal extent of one of its major faces), wherein the deformable membrane is attached to at least one of the one or more chamber walls, wherein the deformable membrane is attached to the one or more chamber walls over more than half of the surface area of the membrane.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future. The delivery system described herein can be implemented as a combustible aerosol provision system, a non-combustible aerosol provision system or an aerosol-free delivery system.

The invention claimed is:

1. An aerosol delivery system comprising an airflow sensor in a sensor chamber defined by one or more chamber walls and a deformable membrane attached to at least one of the one or more chamber walls, wherein the membrane is attached to the one or more chamber walls over more than half of the surface area of one major surface of the membrane.

2. The aerosol delivery system of claim 1, wherein the membrane is bonded to the one or more chamber walls.

3. The aerosol delivery system of claim 2, wherein the membrane is bonded to the one or more chamber walls with adhesive.

4. The aerosol delivery system of claim 2, wherein the membrane is bonded to the one or more chamber walls using a thermal bonding process.

5. The aerosol delivery system of claim 1, further comprising a clamping element arranged to press a portion of the membrane against the one or more chamber walls.

6. The aerosol delivery system of claim 5, wherein the clamping element comprises a latching element arranged to engage a cooperative latching element defined by at least one of the one or more chamber walls.

7. The aerosol delivery system of claim 1, wherein the one or more chamber walls are formed of a plastics material.

8. The aerosol delivery system of claim 1, wherein the membrane comprises a metallic material.

9. The aerosol delivery system of claim 1, wherein the membrane comprises a plastics material.

10. The aerosol delivery system of claim 1, wherein the membrane is substantially impermeable to liquid and partially permeable to gas.

11. The aerosol delivery system of claim 1, wherein a chamber wall comprises a printed circuit board comprising the airflow sensor.

12. The aerosol delivery system of claim 11, wherein at least one further chamber wall is attached to the printed circuit board via one or more mechanical fasteners.

13. The aerosol delivery system of claim 11, wherein at least one further chamber wall is bonded to the printed circuit board.

14. The aerosol delivery system of claim 11, wherein a resilient sealing element is disposed between at least one further chamber wall and the printed circuit board.

15. The aerosol delivery system of claim 1, wherein the membrane separates the sensor chamber from an airflow path comprising an aerosol generator.

16. The aerosol delivery system of claim 1, wherein the airflow sensor comprises a pressure sensor or microphone sensor.

17. A sensor housing for an airflow sensor in an aerosol delivery system, the sensor housing comprising a sensor chamber defined by one or more chamber walls and a deformable membrane attached to at least one of the one or more chamber walls, wherein the membrane is attached to the one or more chamber walls over more than half of one major surface of the deformable membrane surface area.

18. A method of manufacturing a sensor housing for an airflow sensor in an aerosol delivery system, the method comprising the steps of;

providing a sensor housing comprising a sensor chamber defined by one or more chamber walls; and attaching a membrane to at least one of the one or more chamber walls;

wherein the membrane is attached to the one or more chamber walls over more than half of the surface area of one major surface of the membrane.

* * * * *